United States Patent [19]

Zhao

[11] Patent Number: 5,050,901

[45] Date of Patent: Sep. 24, 1991

[54] TWO-WAY SHOCK PROOF AND SHOCK ABSORBING TOWING COUPLING

[76] Inventor: Zhendong Zhao, 25 North Street, Yuetan, Beijing, China

[21] Appl. No.: 438,076

[22] Filed: Nov. 20, 1989

[51] Int. Cl.[5] .............................................. B60D 1/14
[52] U.S. Cl. .................................... 280/474; 280/486
[58] Field of Search ................. 280/483, 474, 486, 480

[56] References Cited

U.S. PATENT DOCUMENTS

| | | | |
|---|---|---|---|
| 2,238,095 | 4/1941 | Almcrantz | 280/483 X |
| 2,727,581 | 12/1955 | Wright | 280/483 X |
| 2,822,188 | 2/1958 | Begin | 280/483 X |
| 3,498,488 | 3/1970 | Wildey et al. | 280/483 X |
| 3,550,710 | 12/1970 | Spanski | 280/483 X |

FOREIGN PATENT DOCUMENTS 914216 6/1954 Fed. Rep. of Germany ...... 280/483

Primary Examiner—Charles A. Marmor
Assistant Examiner—Alan M. Kagen

[57] ABSTRACT

Two-way shock proof and shock absorbing towing coupling, including two opposite planar chain holders, each holder having at least two equally spaced lugs; at least four pairs of chains, each pair having two chain sections, each chain section having a plate link and a joint connected by a pin, two ends of each pair of chains being connected with the opposite lugs on the opposite planar chain holders by pins respectively; two towing frames for connecting with two neighboring vehicles, each frame having at least two arms, each of the arms being connected pivotally with another end of each chain section in each pair of chains, at least one shock proof bearing spring provided between two planar chain holders and the spring being coaxial with the two towing frames, the two nds of the spring abutting against an inner surface of the planar chain holders respectively, and a piston sleeve.

This towing coupling may be used for connecting combination vehicles of water or land transportation so as to increase efficiency and benefit of transportation and service life and safety of transportation facilities.

16 Claims, 2 Drawing Sheets

TWO-WAY SHOCK PROOF AND SHOCK ABSORBING TOWING COUPLING

FIELD OF THE INVENTION

This invention relates to coupling means provided between towing of combination vehicles in water and on land, and more particularly, to a two way shock proof and shock absorbing coupling.

BACKGROUND OF THE INVENTION

During the motion of transportation facilities, shock vibration can be most detrimental. For example, such shock vibration can cause damage to the mechanical structure of the vehicles concerned, such as to shorten or diminish their service life and even to cause damage.

It should be understood that towing of combination vehicles means a combination of vehicles, linked one to the other, such that at least one is being towed by another. Previously, one-way buffer arrangements have been known but these cannot be satisfactorily used in towing combinations. Accordingly, the problem of alternative two way shock vibration along an axis of towing combination vehicles has not been solved simply and reliably until this invention. Such one-way buffers, therefore, cannot be reliably used in the towing means for a train, mine-haul truck, common truck, etc. In particular, the one-way buffer only provides a time lag for starting, which is necessary in the starting process of towing combination vehicles, but it cannot eliminate the great inverse shock caused by braking, especially emergency braking, and moving down along a slope, which seriously affects the service life and safety of transportation facilities.

It is well known that because only one-way shock proof buffers are available, which is effective when starting, is for example provided between railway carriages, great inverse shock will be caused to the railway carriages by slight braking during motion, and by the combination of great shocks between railway carriages, as may be caused by emergency braking or bumping of trains and in other situations will result in turning carriages over and in injuries and deaths of passengers. Such serious accidents have repeatedly occurred in transportation throughout the world.

The application of a two-way shock proof and shock absorbing towing coupling prevents the carriages from being turned over when bumping, even in serious accidents, so as to decrease injuries and deaths, and may eliminate shock vibration which results from braking and running, so as to ensure smooth and steady motion, and increase service life of trains.

Combination vehicles for highway transportation is an ideal way of transportation. However, if a one-way buffer is still used as the towing coupling of the combination vehicles, such combination vehicles can't normally be used because of the inverse shock of the towed vehicles on the leading vehicle and the bumping between the towed vehicles. Therefore, the key reason that there have not been combination vehicles used as real transportation tools for highway transportation so far is that the technique of two-way shock proof and shock absorbing towing coupling has not been provided.

In the towing of marine vehicles or boats, rope connection has long been used. Some factors, such as wind and wave variation, together with the variation of ship speed, result in speed differences and frequent two-way shock between the towing vehicle and the vehicle being towed. The shock stress can be very great, although some shock proof means, such as palm fiber packages, used tires, and the like, are provided on ends of towboats. In order to decrease or avoid the bumping between the marine craft, the distance between such crafts can be enlarged. Thus, towing efficiency is decreased, and energy is wasted. Therefore, two-way shock proof connection is also a key problem to be solved pressingly in water towing transportation.

When a boat anchors, a general method is to tie it to piles by ropes. For a large marine craft such as a big ship, complex facilities, such as the winch and steel cable, and heavy labor operations are often necessary. Because of the great inertia, and because of the long and large ship body and shake of the ship, the ship often bumps the wharf violently. Although some shock proof means, such as hanging pads made of bundles of rubber belts are used, the great bumping stress still results in the deformation of the ship body on both sides. Therefore, one of the difficult technical problems which needs to be solved urgently for anchoring of ships and boats is how to solve thoroughly the two-way shock which may cause disconnection and how to simplify the facilities for anchoring.

To sum up, once two-way shock proof and shock absorbing for towing transportation of various combination vehicles is solved, efficiency and benefit of transportation and service life and safety of transportation facilities will be increased greatly.

OBJECTS AND SUMMARY OF THE INVENTION

It is an object of the present invention to solve simply and reliably a problem existing in the prior art to provide a two-way shock proof and shock absorbing towing coupling for combination vehicles so as to increase transportation ability and save energy.

In order to realize the above-mentioned object, the present invention provides a two-way shock proof and shock absorbing towing coupling, comprising two opposite planar chain holders, each holder having at least two equally spaced lugs; at least four pairs chain means, each pair comprising two chain sections, each chain section having a plate link and a joint connected by pins, two ends of each pair of said chain means being connected with the opposite lugs on said opposite planar chain holders by pins respectively; two towing frames for connecting with two neighboring vehicles, each frame having at least two arms, each of said arms being connected pivotally with another end of each chain section in each pair of chain means; and at least one shock proof bearing spring provided between two planar chain holders and said spring being coaxial with the two towing frames, the two ends of said spring abutting against inner surface of said planar chain holders respectively.

Preferably, said two planar chain holders are connected by four pairs of chain means.

The axes of the lug holes of said planar chain holders may be parallel or perpendicular to the radii of said planar chain holders.

Preferably, the arm of one of the towing frames is spaced with a corresponding arm of another frame by an angle of 90°.

This invention will now be described by way of example only and with reference to the accompanying drawing.

DESCRIPTION OF THE PREFERRED EMBODIMENT

Figure 1:
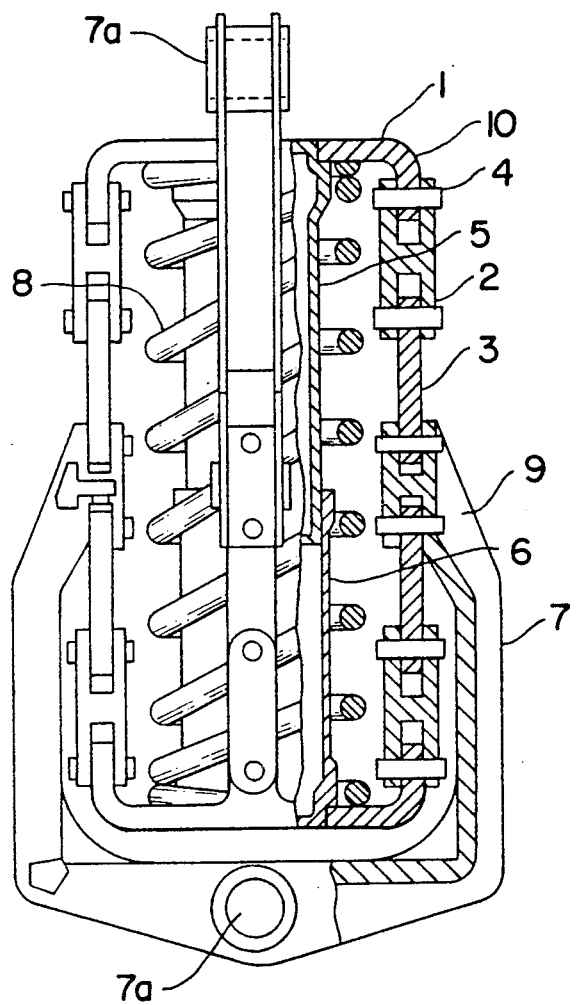
FIG. 1 is a partially sectional plan view of a coupling according to one form of the present invention.
Figure 2:
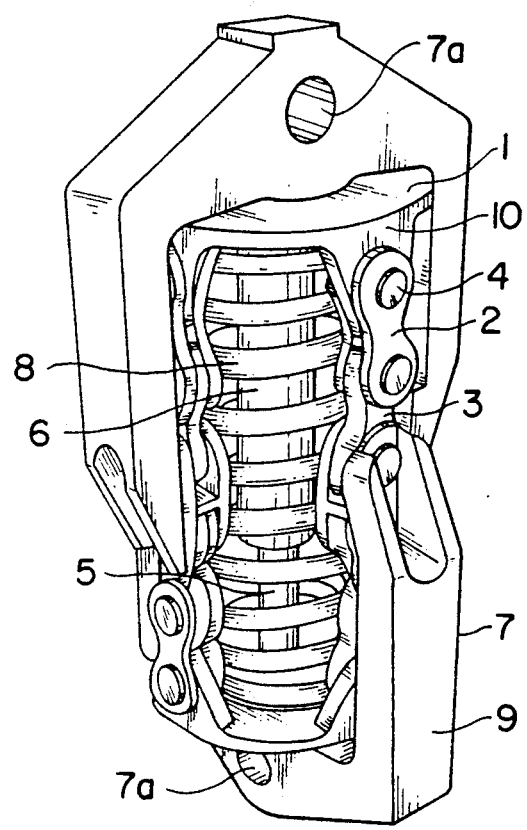
FIG. 2 is a perspective view of the coupling shown in FIG. 1.

The towing coupling of this invention is shown in FIGS. 1 and 2 and includes two planar chain holders 1, each chain holder 1 having lugs 10. The coupling further includes at least four pairs of chain means, each of which has two chain sections, each chain section having a plate link 3 and a joint 2 connected by a pin such as a pivot pin 4. The coupling further includes a piston sleeve means 5, 6; and two towing frames 7 for connection with two vehicles. At least one shock proof bearing spring 8 is provided extending between inner faces of the chain holders 1.

One end of the piston 5 is inserted into the sleeve 6, and shoulders at the other ends thereof are respectively fitted into center holes of the two planar chain holders 1. The shock proof bearing spring 8 spirally extends about the piston sleeve means 5, 6, the ends of the spring 8 abutting against inner surfaces of the two planar chain holders 1 respectively, so as to extend therebetween.

Ends of each joint 2 of the chain means is connected (such as pivotally connected by a pin) with a hole extending through a respective lug extending from the planar chain holder 1.

The axes of the lug holes 1a are preferably transverse to the longitudinal axes of the lugs 10 or have their axes substantially parallel to the radii of the chain holder.

Other ends of the plate links 3 of the chain means are respectively connected with towing frames 7 by means of pivot pins 4 or the like which are fixed through appropriate holes in one plate link 3 and in one arm 9 of the towing frame 7.

As shown in FIG. 1, the towing frames are mounted so as to be substantially transverse relative to each other, the towing frames being so mounted that the arms of one towing frame are substantially at right angles or 90° to the arms of another frame.

The coupling forms the two-way shock proof and shock absorbing coupling, wherein a substantially toggle-like action may be made by the chain means and lugs 10 of the planar chain holders 1 and by chain means and towing frames 7.

The towing frames 7 are provided with engagement or shaft holes 7a for connection with vehicles. Thus, in use, when the towing frames 7 are pulled in opposite directions by taking two shaft holes 7a on the towing frames 7 as bearing points for the load, chain means outside of arms 9 of towing frames 7 are placed under tension and the two planar chain holders 1 connected respectively with said chain means are pressed inward towards the center and each other. Thus, shock proof bearing spring 8 between the two planar chain holders 1 is compressed in a working condition. Chain means inside the arms 9 of the towing frames 7 bend and flex because there is no force acting on them. When the pulling force acting on the bearing force holes 7a of towing frames 7 is instantaneously changed to a pushing force (or shock) towards center, the chain sections inside of arms 9 of the towing vehicle will move from a bending or flexing state (in which there is no force acting on them) to a forced or tensioned state pulling respectively the connected planar chain holders 1 to move towards the center, the compressed condition of shock proof bearing spring 8 changing to an unforced or uncompressed condition, and then to the compressed condition again. The tensioned condition of chain means outside of arms 9 of the towing frame 7 is then changed to the unforced, bending or flexing condition. Therefore, while the condition of the towing couplings 7 change instantaneously from a pulled condition to a pressed condition (such as on braking or the like), the shock proof bearing springs 8 still work in the compressed condition. This action may be further assisted by a piston sleeve means 5, 6.

During the change of the forces, there is no shock causing disconnection, and the combination vehicles can bear and absorb the load safely and reliably, absorbing vibration caused by the shock. Each pair of chain means bears no shock causing disconnection and can operate safety and reliably during the change of forces.

An embodiment of the two-way shock proof and shock absorbing coupling of the present invention is one used in truck combination vehicles for highway transportation, for example, in which a truck of model Dong-Feng 140 made in China is used as the leading vehicle and connects two towed vehicles by the couplings of the present invention. After experiments of transporting coal were made with the above-mentioned combination vehicles on highway, good results have been obtained as follows:

1. The total loading of the combination vehicles is about 22 tons ±1 ton and it is increased by one third.

2. The behavior of said truck combination vehicles during starting and turning are similar to those of a single vehicle; there is no vibration caused by time lag while starting and driving back, and the minimum turning radius is about 6 meters.

3. Driver and passengers have no feeling of inverse shock while the truck's brake is applied suddenly or driving down a long slope, and the safety distance needed for braking of said truck combination vehicles in an emergency substantially equals that needed for braking of a single vehicle. The safety and stability of transportation are improved.

4. The adaptability of said truck combination vehicles to the slope variations, curvature and surface of highway, and bearing strength of bridges are similar to those of a single vehicle. Besides, the truck combination vehicles may not affect the normal traffic and transportation on the highway.

5. The said truck combination vehicles can be driven over a road with a maximum slope of about 25°, which is in conformity with the general demand on the vehicle driving on a slope.

Energy can be saved through using the coupling of the present invention, and money can be saved by using the truck combination vehicles connected with the couplings of the present invention. Using truck combination vehicles is an effective way to save energy, to increase the transportation ability and to solve the problem of heavy and busy transportation. More economic benefits may be brought about as it is widely used.

ADVANTAGE OF THE INVENTION

Essentially, the advantages of the invention lie in that it is easy to design and make various models and series of two-way shock proof and shock absorbing towing couplings of the present invention according to the demands of different towing combination vehicles for land, water or air transportation, and for military or civilian transportation. Since the towing frame, planar chain holder, spring and chain means are common and simple mechanical parts, their processings are well know. The towing coupling of the present invention can be produced in batches, and forms complete sets with various transportation and towing means.

For any type of towing combination vehicles in transportation, the two-way shock proof and shock absorbing towing coupling of the present invention can assure time lag necessary for smooth starting, and absorb shock vibration between combination vehicles during starting, and absorb effectively vibration caused by tossing or series connection during the motion, and absorb inverse shock caused by the rear vehicle bumping the front one during speeding down, braking, and moving down, braking, and moving down along a slope.

The present invention enables the truck towing vehicles to be used as a real transportation tool, the energy source to be saved and transportation efficiency to be increased, and the cost of truck transportation to be reduced to correspond to the cost of railway transportation, thus enabling the advantages of truck transportation (great flexibility, wide adaptability) to be well utilized.

This invention has been described by way of example only and it should be appreciated that modifications and improvements may be made to the invention without departing from the scope thereof as defined by the appended claims.

I claim:

1. A two-way shock proof and shock absorbing towing coupling, comprising:
    two mutually opposing chain holders, each chain holder having at least two pairs of spaced lugs;
    at least four parts of chain means, each pair of chain means including two chain sections, first ends of each pair of said chain means being connected to opposite lugs on opposite chain holders by pins, respectively;
    two mutually opposing towing frames for connecting adjacent vehicles, each towing frame having at least two arms, each of said arms being pivotally connected with second ends of each chain section in each pair of chain means, wherein the arms of one towing frame are spaced substantially perpendicular relative to the arms of another towing frame; and
    at least one shock proof bearing spring provided between said chain holders, said spring being substantially coaxial with said two towing frames, opposing ends of said shock proof bearing spring abutting against and between inner surfaces of said chain holders, respectively;
    wherein a pulling action on said mutually opposing towing frames tensions selected ones of said at least four pairs of chain means thereby compressing said planar chain holders and said shock proof bearing spring while remaining ones of said at least four pairs of chain means bend and flex in an absence of tension, and upon an instantaneous change from the pulling action to a pushing action releases compression of said planar chain holders and said shock proof bearing spring and subsequently tensions selected ones of said at least four pairs of said chain means thereby compressing said planar chain holders and said shock proof bearing spring while remaining ones of said at least four pairs of chain means bend and flex in an absence of tension, thereby preventing a disconnecting shock to said towing coupling when either a pulling or pushing action is applied thereto.

2. The two-way shock proof and shock absorbing towing coupling according to claim 1, wherein said two chain holders are connected by four pairs of chain means.

3. The two-way shock proof and shock absorbing towing coupling according to claim 2, wherein each chain section includes a plate link and a joint connected by a pivot pin.

4. The two-way shock proof and shock absorbing towing coupling according to claim 2, wherein the lugs of the chain holders are provided with lug holes, said lug holes being substantially transverse to the longitudinal axes of said lugs and substantially parallel to radii of said chain holders.

5. The two-way shock proof and shock absorbing towing coupling according to claim 1, further including a piston sleeve extending between said chain holders, wherein said shock proof spring substantially surrounds said piston sleeve.

6. The two-way shock proof and shock absorbing towing coupling according to claim 5, wherein said chain holders are connected by four pairs of chain means.

7. The two-way shock proof and shock absorbing towing coupling according to claim 6, wherein each chain section includes a plate link and a joint connected by a pivot pin.

8. The two-way shock proof and shock absorbing towing coupling according to claim 6, wherein the lugs of the chain holders are provided with lug holes, said lug holes being substantially transverse to the longitudinal axes of said lugs and substantially parallel to radii of said chain holders.

9. The two-way shock proof and shock absorbing towing coupling according to claim 5, wherein each chain section includes a plate link and a joint connected by a pivot pin.

10. The two-way shock proof and shock absorbing towing coupling according to claim 5, wherein the lugs of the chain holders are provided with lug holes, said lug holes being substantially transverse to the longitudinal axes of said lugs and substantially parallel to radii of said chain holders.

11. The two-way shock proof and shock absorbing towing coupling according to claim 1, wherein said chain holders are connected by four pairs of chain means.

12. The two-way shock proof and shock absorbing towing coupling according to claim 11, wherein each chain section includes a plate link and a joint connected by a pivot pin.

13. The two-way shock proof and shock absorbing towing coupling according to claim 11, wherein the lugs of the chain holders are provided with lug holes, said lug holes being substantially transverse to the longitudinal axes of said lugs and substantially parallel to radii of said chain holders.

14. The two-way shock proof and shock absorbing towing coupling according to claim 1, wherein each chain section includes a plate link and a joint connected by a pivot pin.

15. The two-way shock proof and shock absorbing towing coupling according to claim 14, wherein the lugs of the chain holders are provided with lug holes, said lug holes being substantially transverse to the longitudinal axes of said lugs and substantially parallel to radii of said chain holders.

16. The two-way shock proof and shock absorbing towing coupling according to claim 1, wherein the lugs of the chain holders are provided with lug holes, said lug holes being substantially transverse to the longitudinal axes of said lugs and substantially parallel to radii of said chain holders.

* * * * *